United States Patent [19]
Solhjell et al.

[11] Patent Number: 5,347,407
[45] Date of Patent: Sep. 13, 1994

[54] METHOD AND SYSTEM FOR REMOVING PARTICLES WITHOUT REQUIRING A SEPARATE CLEANING MECHANISM FROM A TAPE IN A TAPE DRIVE SYSTEM

[75] Inventors: Erik Solhjell; Tore Ronning, both of Oslo, Norway

[73] Assignee: Tandberg Data A/S, Oslo, Norway

[21] Appl. No.: 890,006

[22] Filed: May 29, 1992

[51] Int. Cl.$^5$ .................... G11B 5/09; G11B 15/48
[52] U.S. Cl. ................... 360/53; 360/74.1; 360/137; 15/DIG. 3
[58] Field of Search ............... 360/53, 31, 71, 72.1, 360/72.2, 74.1, 74.4, 75, 128, 137; 15/DIG. 3

[56] References Cited

U.S. PATENT DOCUMENTS

| | | | |
|---|---|---|---|
| 3,579,211 | 5/1971 | Larsen | 360/53 |
| 3,731,289 | 5/1973 | Bajgert et al. | 360/128 |
| 4,185,306 | 1/1980 | Dudley | 360/128 X |
| 5,193,033 | 3/1993 | Shimoi et al. | 360/31 |

*Primary Examiner*—John Shepperd
*Assistant Examiner*—Patrick Wamsley
*Attorney, Agent, or Firm*—Hill, Steadman & Simpson

[57] ABSTRACT

A method and system detect and remove particles from a tape. Debris on a tape can cause errors. Location of the tape is continuously monitored, and when an error is detected during a data transfer operation, the tape is moved and re-positioned to rewrite a data block where the error was detected. If the error is not corrected, a minimum threshold requirement is decreased so the system detects the data block as corrected thereby avoiding system hang-ups or the like.

14 Claims, 3 Drawing Sheets

METHOD AND SYSTEM FOR REMOVING PARTICLES WITHOUT REQUIRING A SEPARATE CLEANING MECHANISM FROM A TAPE IN A TAPE DRIVE SYSTEM

BACKGROUND OF THE INVENTION

The present invention generally relates to a method for reducing errors in tape drives. More specifically, the invention relates to hard write and read errors in tape drives due to debris on the head or on the tape itself.

Typically, tape drives can be used for storing data from computers, data acquisition systems, and the like. Tape drives are often operated by trained technicians, frequently in controlled environments, to reduce any problems or malfunctions which may arise. However, this is not always the case. Tape drives are now used more frequently being used in a variety of environments by personnel with no special training in tape drive or tape maintenance and care.

Furthermore, tape drives are often required to operate without anyone supervising their operation for an extended period, for example, during back up operations which often take place in the nighttime. Corporate users, like banks, governmental offices, insurance companies and the like often require a tape system which is capable of operating unattended for a period of several hours. This operation is more critical in systems designed as auto loaders, libraries and stackers in which the system automatically picks one tape from a tape magazine without any operator interference.

A major source for failure in such systems is debris which accumulates on the head or on the tape itself. Debris may come from the tape, the tape cassette (cartridge) mechanism, the tape drive or the surrounding air. In addition, human debris is often a source for this problem. Debris which accumulates on the head and/or tape will often lift the tape away from the head. As a result, signal output falls exponentially when the distance between the tape and head increases. Therefore, maintaining both a clean head and a clean tape is important.

This problem is further apparent in high density tape drives which often record at more than 50,000 flux transitions per inch. At these densities, a small amount of debris may significantly reduce the signal amplitude to the extent that the drive cannot read back any data. When performing a read-while-write operation, a tape drive which encounters a hard write error will typically attempt a rewrite operation of the data further down the tape. In many systems, this rewriting operation may be performed as many as sixteen or more times before the system gives up. If the debris is physically on the tape itself, this rewrite procedure will normally work well; however, if the debris is on the recording head, rewriting the data block several times does not typically solve the problem.

During read operations, if the drive encounters a hard read error, it will either try to read the block several times or use error correction characters (ECC) to regenerate the lost data. As long as the debris is on the tape itself, this will normally work; however, with debris on the head, the chances of recovering the data is reduced.

Hard write errors have become a more serious problem than hard read errors. A first reason for this is that tape systems often employ powerful ECC systems which can correct even major read errors. Another reason is that systems often can read signals reliably to less than ten percent of their nominal value. In contrast, when writing, most systems require the minimum signal read back in read-while-write mode to be in the order of thirty-five to forty percent. Therefore, a drive may report a hard write error because the read signal has dropped to, as an example twenty percent, although the drive itself would be able to read such a signal. A tougher requirement on the quality of the read signal during the read-while-write operation insures adequate margins for tapes if they are to be read by other tape drives and/or stored for a long period of time.

Traditionally, a method which is used to remove debris from recording heads includes some form of cleaning, either manually or using some form of cleaning tape or cleaning cassette/cartridge. Such a method is normally effective for removing debris on the head itself, but typically requires an operator to perform at least part of the operation. As previously stated, this is frequently not desirable or not possible. Additionally, if debris is stuck on the tape itself, head cleaning will normally not solve this problem.

To avoid problems with debris on the tape itself, ½-inch systems in which tape reels were handled by skilled operators can employ special scrapers built into the tape drive. These scraping devices can be effective in removing debris from the tape. In addition, other systems have been designed with separate scraping units. If a tape system failed with a hard write or read error, the operator may first attempt to clean the head by some manual method. If that did not solve the problem, the operator could then remove the tape reel and run it past a scraping device. These methods, coupled with the fact the systems were operating at fairly low linear densities and with wide tracks, can make such operations reliable.

Today, however, the situation has changed. First, the most popular form of tape drive system is no longer the 178-inch reel-to-reel system. The 174-inch tape cartridge is now the most popular form of tape for data storage. Some cartridges can hold more than two GBytes of data. However, the ¼-inch tape cartridge has the problems related to hard write and read errors. For such high capacity systems, errors are becoming more and more of a problem. This is partially due to the increase in linear density and number of tracks, and further due to the fact that systems are typically operated by non-skilled workers in all kinds of environments. Additionally, since the tape is inside the cartridge, tape cleaning is more difficult. Traditional scrapers cannot normally be used since they may negatively influence the high density recordings.

SUMMARY OF THE INVENTION

It is, therefore, an object of the present invention to provide a method for reducing hard write and read errors in tape drives. To this end, a method is provided for removing debris from the head or from the tape without the need for a special system or for operator support. In addition, a method is provided for finishing the write operation in a controlled fashion even if all of the debris has not been removed.

Additional features and advantages of the present invention are described, and will be apparent from, the detailed description of the presently preferred embodiments and from the drawings.

BRIEF DESCRIPTION OF THE DRAWINGS

FIGS. 5, 5A, 5B and 5C illustrate the positioning of the tape to correct errors in data blocks of the tape.

DETAILED DESCRIPTION OF THE PRESENTLY PREFERRED EMBODIMENTS

Figure 1:
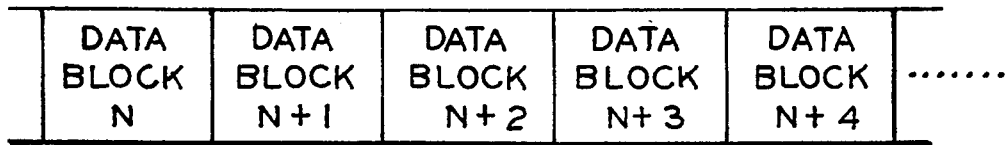
FIG. 1 is a diagram of a typical track layout of a tape.

In accordance with the invention, a method is provided for removing or reducing read errors and write errors during data transfer operations due to debris or other external condition on a tape or on a head of a tape drive. The method is applicable to ¼-inch tape cartridges or any other system in which a recording media, such as a tape, is in contact with the head. The present invention will be described with respect to hard write errors since such errors are typically the most serious errors and the most difficult errors to correct. However, the method works equally well for read errors. In most tape drives, the device is operated in a "streaming" mode. That is, the tape is kept running continuously from one end to the other while fixed blocks of data bytes are written one track at a time. FIG. 1 shows a typical track layout of a tape 10.

Data blocks N, N+1, N+2, . . . of the tape 10 are normally of equal size (typically containing 512 or 1024 bytes of user data). The gap area between data blocks is typically small and can be recorded with high density bit patterns.

Figure 2A:
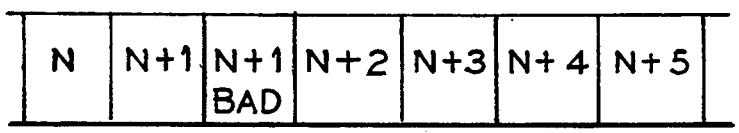
FIG. 2A illustrates a data track where an error is detected before a block is written.
Figure 2B:
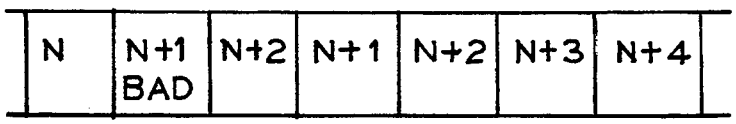
FIG. 2B illustrates a data track where an error is detected after a block has been written.

A tape drive may detect a "bad" block, i.e. a block containing debris on the tape 10 or on the head of the tape drive at a point on the tape 10, during the write operation (read-while-write mode) and will normally rewrite the block further down the tape 10. FIGS. 2A and 2B illustrate this process.

In FIG. 2A, block N+1 has been determined as a bad block. In a typical rewrite situation, if the drive determines that block N+1 is bad before it actually has finished writing that block, the N+1 block can be rewritten in the next block as shown. However, often the distance between the write head and the read head is larger than the distance between adjacent data blocks.

FIG. 2B illustrates the situation where the distance between the write head and the read head is large, and the drive is physically writing block N+2 when block N+1 has been determined as a bad block. When this occurs, block N+1 is not rewritten until block N+2 has been written. The actual rewrite sequence, therefore, may vary depending upon the actual format of the system and its requirements. However, any bad block will be rewritten at some point further down the tape track.

Figure 3A:
FIGS. 3A and 3B illustrate track layouts where all blocks labeled "N" have an error detected.
Figure 3B:
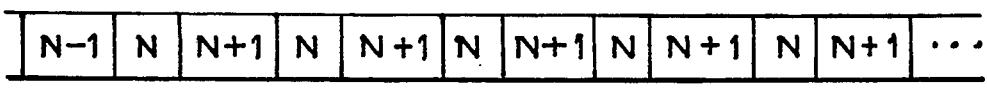

FIG. 3A illustrates a situation in which a hard write error occurs where block N has been recorded sixteen times and each block N is bad, i.e. each has failed the read-while-write check. The system will then stop the tape 10 and report a hard write error. Depending upon the system, other hard write error layouts may also occur like that shown in FIG. 3B in which all data block N's of the tape 10 are bad. When this hard write error situation occurs like that shown in FIG. 3B, a host system will be incapable of detecting whether any recorded block N's can be reliably read back at a later time. A further problem occurs when new data is appended to the recorded tape, for example, after a manual head cleaning operation. In addition, predicting how many of the N blocks were actually recorded on the tape cannot be determined. Therefore, in an append operation, the drive cannot reliably read forward until the last block N because the drive cannot detect whether the block is the last one recorded. Since the drive is continuously unable to write block N correctly, a high probability exists that some debris has accumulated on the head. Debris must then be removed or at least reduced as hereinafter described.

When rewriting of a block is required, the drive keeps track of the number of blocks being rewritten. In addition, the drive monitors where it is physically located on the tape 10 at all times. This may be performed by measuring the distance from one of the ends of the tape by counting pulses from a tachometer mounted on a motor system which moves the tape 10. Pulses may be generated and counted by motor brushes or counted from Hall effect sensors which can be used to control the operation of brushless motors or by similar means. In addition, tapes with prerecorded information along one or more of the tracks may also be used. Such specially recorded track information may then be used to determine the current location of the tape.

When a hard write error occurs, the drive ceases writing after a predetermined number of rewrites. This number is less than the number of allowable rewrites when using a format standard. The drive stores tape location data for the last block it tried to write regardless of whether it was able to detect this block. This location will be hereinafter referred to as point T.

Figure 4:
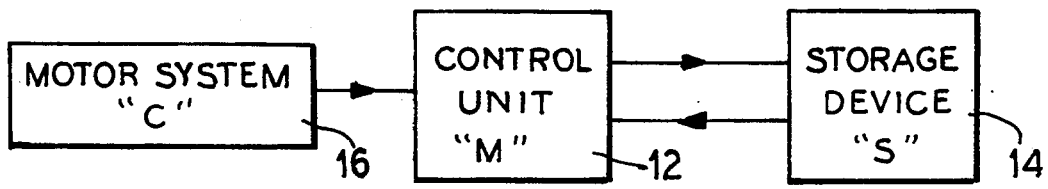
FIG. 4 is a block diagram of a tape drive control unit for monitoring and storing tape position data.
Figure 6:
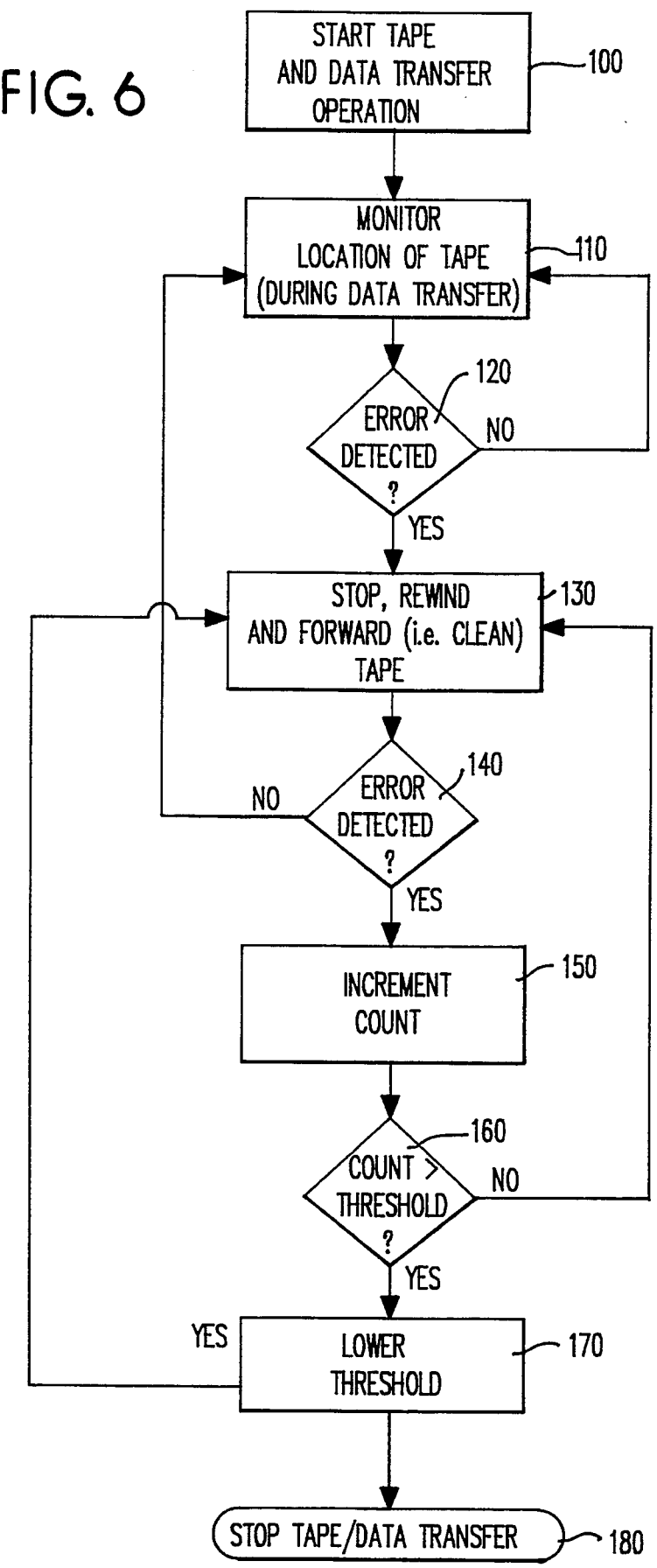
FIG. 6 illustrates a flowchart detailing the method and the system of the present invention.

FIG. 4 illustrates a block diagram of a tape drive control unit which monitors and stores such tape positions, and FIG. 6 illustrates a flowchart indicative of the functions of the tape drive control unit, particularly the control unit 12 illustrated in FIG. 4. A microprocessor or control unit 12 and a storage device 14, such as a random access memory (RAM), is shown. The RAM 14 stores data generated by the control unit 12 and transfers the stored data back to the control unit 12. A motor system 16 transfers signals for driving of the tape 10 by the control unit 12. These signals carry information which may be used by the control unit 12 to determine the physical tape position as shown at 110 of FIG. 6. The signals may be pulses which are related to the rotation of the motor generated by a tachometer or a similar device.

The control unit 12 may then calculate the position of the tape 10 based on the input from the motor system 16. This information is then stored in the storage device 14. If required, the control unit 12 may read this information at a later time during its operation.

System operation begins by the drive running the tape 10 in an opposite direction when an error is detected as shown at 120 and 130 of FIG. 6. The actual time may vary depending upon the particular tape and system being used, but in general, this distance should at least be equivalent to several hundred blocks of data.

The tape 10 is stopped and is run in a forward direction while reading until the last good block N-1 is detected. Either immediately after this point or between this point and point T, the drive begins either writing gap code information (typically high density code) or repeats writing of block N until it passes point T. Block N continues to be written in a read-while-write mode until it is determined as "good" or until the maximum number of allowable block rewrites has been reached.

The system, therefore, detects where the last bad block N was recorded on the tape 10 (point T), executes tape movement in the opposite direction for a specified time period, and moves forward again until the point of the last good block N-1 is read. At this point, the write operation is started either immediately or at least somewhere between this point and the writing of either gap information or block N information. The write operation is continued until the point (T) of the last written block N where the system starts performing normal writing of block N with read-while-write checking.

In some cases, the above operation may be performed several times in order to remove the debris from the tape path. This may be performed since the system is equipped to determine and to remember the physical location of the last recorded (bad) block on the tape.

Figure 5:
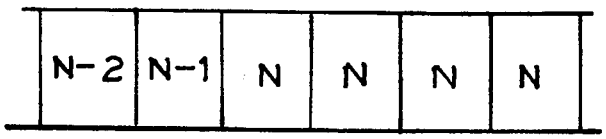

FIGS. 5A-5C and 6 illustrate this process. FIG. 5A shows the write operation taking place until a fixed number of bad blocks (N) have been recorded. At this point, information may be stored regarding the location of the last recorded block N (point T).

The tape 10 is then moved in the opposite direction for a specified distance, typically several hundred blocks as shown in FIG. 5B. The tape 10 is then moved forward as shown in FIG. 5C while reading until the last good block N-1 is detected. The write operation is restarted by writing either blocks N or N-1 or gap information until the point T is reached. The writing of block N is continued while performing the read-while-write operation until block N is determined to be good or the maximum number of rewritten blocks is reached.

The operation of moving the tape 10 in the opposite direction first and then back again effectively removes debris on the head by wearing it down. In some cases, the operation may be repeated and, if necessary, the tape 10 may move a greater distance in the opposite direction. If, however, debris remains on the head, the system may implement the following steps to avoid system hang-ups, "down" time, and the like.

The operation as described above for the hard write error problem will be repeated once. If, however, the error recurs (as shown at 140 of FIG. 6), the read-while-write checking is performed with a read threshold set at a lower level, for example, five or ten percent. If debris still exists on the head 20, lowering of the threshold increases the probability of the block being read as good since a lower threshold decreases the quality requirement. These functions of the system are more clearly shown with reference to the flowchart of FIG. 6 and, more particularly, steps 150, 160 and 170.

When the bad block can finally be read as good, the drive terminates the write operation with this block and reports to the control unit 12 that the last block was determined as good by using the lower threshold level. This lowering of the read-while-write threshold does not typically remove any debris on the head, but enables the drive to terminate the write operation with a good block which is important for avoiding system hang-ups.

An alternate method has identical initial steps as that previously described. That is, the drive keeps track of the number of blocks being rewritten, and monitors where it is physically located on the tape 10. When a hard write error occurs, the drive stops writing after a predetermined number of rewrites. This number is less than the number of allowable rewrites given by the format standard. The drive remembers the tape location for the last block it tried to write regardless of whether detection of that block occurred. This location, as before, will be referred to as point T.

The alternate method hereinafter described deviates from the method described previously in the following manner. The tape 10 continues to run in the same direction away from point T while slowly moving the head downward until the recording gaps are at or below the lower tape edge. The tape 10 is then stopped and run in the opposite direction while gradually moving the head upwards, i.e. transverse to the direction of tape movement, until the recording gaps are at or above the upper edge of the tape 10.

The tape 10 continues running in the same direction while moving the head down, i.e. in an opposite transverse direction to the upward movement, until it is in a correct position for reading and recording on the track. If necessary, the tape 10 continues running until the head is well back into an already recorded area of the tape.

The tape 10 is then stopped and moved in the opposite or original direction again until the head is in the area between the last good .block N-1 and the point T. In this area, the write operation is started while the tape 10 is still running in the same direction. In addition, the drive starts writing block N and performs a read-while-write operation at the same time. Block N continues to be written in a read-while-write mode until it is determined as good or until the maximum number of allowable block rewrites has been reached.

The head movement operation may, as well, be performed in the opposite mode, that is, moving the head upwards and then moving it downwards, i.e. in respective directions transverse to the direction of tape movement. It is not critical to move the head such that the gaps are actually crossing over the edges of the tape 10; however, the head movement should at least cover a reasonable distance across the tape 10.

This method of moving the head up or down while moving the tape 10 forward and in reverse may be performed repeatedly. If necessary, if an error still exists, it may be necessary to perform a controlled write termination operation by executing a low threshold read-while-write operation as previously described.

Although other modifications and changes may be suggested by those skilled in the art, it is the intention of the inventors to embody within the patent warranted hereon all changes and modifications as reasonably and properly come within the scope of their contribution to the art.

We claim:

1. A method for removing particles without requiring a separate cleaning mechanism from a tape in a tape drive system including a write/read head wherein a data transfer operation is completed by satisfying a threshold requirement indicative of no errors on said tape, said method comprising the steps of:

monitoring the location of said tape during said data transfer operation, said location being monitored relative to an end of said tape or prerecorded data on said tape wherein said monitoring is performed continuously;

detecting for an occurrence of said particles indicative of an error on said tape during said data transfer operation;

stopping said data transfer operation upon said occurrence of said error;

rewinding said tape to a location substantially distant from the location of said error such that the particles are removed from the tape;

forwarding said tape to a location of last good data information preceding the location of said error; and rewriting information of said data stream at the location of said error.

2. The method of claim 1 further comprising the step of:

continuing said data transfer operation after rewriting of said information.

3. The method of claim 1 further comprising the step of:

adjusting said threshold requirement if said error recurs after a predetermined number of repetitions of said rewriting.

4. The method of claim 1 wherein said information is gap code information.

5. The method of claim 1 wherein said information is a data block.

6. A method for detecting and correcting errors due to an error condition and removing particles causing the error condition thereby affecting a tape during data transfer without a separate cleaning mechanism, said method comprising the steps of:

monitoring location of said tape, said location being monitored relative to an end of said tape or prerecorded data on said tape, wherein said monitoring is performed continuously;

detecting the error condition affecting said data transfer during said data transfer, said error condition due to the particles on the tape;

terminating said data transfer after detecting the error condition;

rewinding said tape to a position distant from said error condition such that the particles are removed from the tape;

forward said tape to a position of last good information proceeding said error condition; and rewriting said information after said tape has been positioned at said position preceding said error condition.

7. The method of claim 6 further comprising the step of:

adjusting a threshold level if said external condition exists after said information is rewritten.

8. The method of claim 6 wherein said information is a data block.

9. The method of claim 6 wherein said information is gap code information.

10. A system for removing particles without requiring a separate cleaning mechanism from a tape in a tape drive system wherein a data transfer operation satisfies a threshold requirement indicative of no errors, said system comprising:

means for monitoring location of said tape during said data transfer operation, said location being monitored relative to an end of said tape or prerecorded data on said tape, wherein said monitoring is performed continuously;

means for detecting an occurrence of said particles indicative of an error on said tape during said data transfer operation;

means for stopping said data transfer operation after said occurrence of said error;

means for positioning said tape at a location of a last good data block preceding the location of said error; and means for rewriting a data block of said data stream at the location of said error.

11. The system of claim 10 wherein said means for positioning rewinds said tape to a location substantially distant from the location of said error and then forwards said tape to a location of said last good data block preceding the location of said error.

12. The system of claim 10 further comprising:

means for adjusting said threshold requirement if said means for rewriting fails to correct said error.

13. A method for detecting and correcting an error in a data stream of a tape in a tape drive system including a write/read head wherein a data transfer operation is completed by satisfying a threshold requirement indicative of no errors on said tape, said method comprising the steps of:

monitoring the location of said tape during said data transfer operation, said location being monitored relative to an end of said tape or prerecorded data on said tape at a know location wherein said monitoring is performed continuously;

detecting for an occurrence of said error on said tape;

stopping said data transfer operation upon said occurrence of said error;

rewinding said tape to a location substantially distant from the location of said error;

forwarding said tape to a location of last good data information preceding the location of said error;

rewriting information of said data stream at the location of said error; and decreasing said threshold requirement if said error recurs after a predetermined number of repetitions of said rewriting step.

14. A method for detecting and correcting an error in a data stream of a tape in a tape drive system including a write/read head wherein a data transfer operation is completed by satisfying a threshold requirement indicative of no errors on said tape, said method comprising the steps of:

monitoring the location of said tape during said data transfer operation, said location being monitored relative to an end of said tape or prerecorded data on said tape at a know location wherein said monitoring is performed continuously;

detecting for an occurrence of said error on said tape;

stopping said data transfer operation upon said occurrence of said error;

rewinding said tape to a location substantially distant from the location of said error;

forwarding said tape to a location of last good data information preceding the location of said error;

rewriting information of said data stream at the location of said error wherein said rewinding and forwarding steps further comprising the steps of:

moving said head in a direction transverse to the direction of said tape during said rewinding; and moving said head during said forwarding in an opposite transverse direction from the direction during said rewinding.

* * * * *